UNITED STATES PATENT OFFICE.

BIRGER FJELD HALVORSEN, OF CHRISTIANIA, NORWAY.

METHOD OF TREATING IRON ORES.

1,024,629. Specification of Letters Patent. Patented Apr. 30, 1912.

No Drawing. Application filed March 25, 1909. Serial No. 485,817.

*To all whom it may concern:*

Be it known that I, BIRGER FJELD HALVORSEN, a subject of the King of Norway, residing at Christiania, Norway, have invented certain new and useful Improvements in the Method of Treating Iron Ores; and I do hereby declare the following to be a full, clear, and exact description of the invention, such as will enable others skilled in the art to which it appertains to make and use the same.

My invention consists in a method of treating iron ores.

As most metals are found in nature bound to sulfur or oxygen, several metallurgical processes are based upon the use of sulfidic ores for reducing the oxids. Such processes are for instance used in the production of lead and copper, "pyritic smelting."

The present invention relates to the production of iron, steel and iron alloys such as nickel steel, ferroboron by heating a mixture of suitable sulfids and oxids in an electric furnace under special conditions.

A serious drawback in the processes above referred to is that large quantities of sulfur dioxid are produced in so dilute a form, that it does not pay to utilize it. The result is, that the vegetation in the neighborhood of metallurgical works of this kind is seriously injured by the gases spread in the atmosphere. In my process however the sulfur dioxid is obtained in a concentrated form and is therefore a valuable by-product.

In working out the present invention it has, by a series of experiments, been ascertained that it will hardly be possible to produce a marketable iron by smelting impure iron ores such as they are generally found in nature, because the slag formed is a great hindrance to the reaction. The slag greatly impedes the escape of sulfur dioxid, so that, at the best, a highly sulfureted and thus almost valueless iron is obtained; most of all a basic slag has this effect. The slag impedes the expulsion by preventing the constituents from getting into contact with each other. For this reason I make use of rich ores and especially such ores that have been dressed by magnetic separation or in other manner, so that the formation of slag is limited to a minimum; the process is then greatly facilitated, and it is possible to obtain a product nearly free from sulfur. It is of advantage to raise the temperature at the end of the process and to cause the mass to be vigorously stirred, preferably by blowing in air. Sometimes it is of advantage to finally add a highly basic slag. There should further always be some excess of oxid ore the complete removal of the sulfur being thereby facilitated.

The process is particularly useful for a rational utilization of magnetic pyrites containing nickel of which pyrrhotite is an example. These magnetic pyrites are first separated magnetically, whereby gangue and copper is separated off. The substantially pure magnetic pyrite is then smelted as above, with a suitable quantity of oxid ore, such as magnetically separated magnetic iron ore dust or roasted magnetic pyrites. A nickel-iron alloy with some oxid of iron is then obtained. This can readily be transformed into nickel-steel for instance by adding a suitable quantity of pig iron. The sulfur dioxid escaping during the process is, on account of its concentration, of great value for instance for the production of sulfite cellulose, for the manufacture of sulfuric acid or the like.

Claims.

1. The process of producing iron and iron alloys and sulfur dioxid, consisting in smelting together a suitable mixture of purified sulfid ores and oxid ores in an electric furnace without the addition of basic fluxing materials until the expelling of the sulfur is almost finished, and then refining the product by raising the temperature, stirring the mass and at last adding a strongly basic fluxing material, as lime.

2. The process of producing iron and iron alloys and sulfur dioxid consisting in smelting in an electric furnace without fluxing material a mixture of concentrated sulfid ores and an oxid ore of iron in excess of the quantity required for the formation of the sulfur dioxid and blowing air through the mixture.

3. The process of producing iron and iron alloys and sulfur dioxid, consisting in smelting in an electric furnace without fluxing material a mixture of concentrated sulfid ores and an oxid ore of iron in excess of the quantity required for the formation of the sulfur dioxid, and adding fluxing material after substantially all of the sulfur has been removed.

4. The process of producing iron and iron alloys and sulfur dioxid, consisting in smelting in an electric furnace without fluxing material a mixture of concentrated sulfid ores and an oxid ore of iron in excess of the quantity required for the formation of the sulfur dioxid, and adding basic fluxing material after substantially all of the sulfur has been removed.

5. The process of producing iron and iron alloys and sulfur dioxid from sulfid ores and oxid ores, which consists in dressing the ores to remove the greater part of the gangue and then smelting together a suitable mixture of such purified ores in an electric furnace without the addition of fluxes and adding flux after the elimination of the sulfur has been effected.

In testimony that I claim the foregoing as my invention, I have signed my name in presence of two subscribing witnesses.

BIRGER FJELD HALVORSEN.

Witnesses:
 HENRY BORDEWICH,
 MICHAEL ALGER.

Copies of this patent may be obtained for five cents each, by addressing the "Commissioner of Patents, Washington, D. C."